(12) United States Patent
Kruger et al.

(10) Patent No.: US 8,781,877 B2
(45) Date of Patent: Jul. 15, 2014

(54) DATA INTEGRATION AND ANALYSIS

(75) Inventors: Michael W. Kruger, Glenview, IL (US); Romesh Wadhwani, Los Altos Hills, CA (US)

(73) Assignee: Information Resources, Inc., Chicago, IL (US)

( * ) Notice: Subject to any disclaimer, the term of this patent is extended or adjusted under 35 U.S.C. 154(b) by 155 days.

(21) Appl. No.: 13/408,743

(22) Filed: Feb. 29, 2012

(65) Prior Publication Data

US 2012/0158460 A1    Jun. 21, 2012

Related U.S. Application Data

(63) Continuation of application No. 13/299,743, filed on Nov. 18, 2011, now Pat. No. 8,589,208.

(60) Provisional application No. 61/415,623, filed on Nov. 19, 2010.

(51) Int. Cl.
*G06Q 10/00* (2012.01)
*G06Q 30/02* (2012.01)

(52) U.S. Cl.
CPC ........ *G06Q 30/0201* (2013.01); *G06Q 30/0204* (2013.01); *G06Q 30/0205* (2013.01)
USPC ....................................................... 705/7.35

(58) Field of Classification Search
USPC ....................................................... 705/7.34
See application file for complete search history.

(56) References Cited

U.S. PATENT DOCUMENTS

| | | | | |
|---|---|---|---|---|
| 7,243,075 | B1 * | 7/2007 | Shaffer et al. | 705/7.34 |
| 8,219,535 | B1 * | 7/2012 | Kobori et al. | 707/694 |
| 2011/0047072 | A1 | 2/2011 | Ciurea | |
| 2011/0087519 | A1 | 4/2011 | Fordyce, III et al. | |
| 2012/0150587 | A1 | 6/2012 | Kruger et al. | |

OTHER PUBLICATIONS

Webber, "The Relative Power of Geodemographics vis a vis Person and Household Level Demographic Variables as Discriminators of Consumer Behavior", 2004.*
Troy, Mike. CVS' new CMO headlines IRI insight summit. Drug Store News, 30, 4, 3(2) Mar. 17, 2008 dialog file 0023534719.*
IRI Continues CPG and Retail Industry Transformation With Content-on-Demand Factory; Industry's First Content-on-Demand Factory to Revolutionize How Manufactures and Retailers Go to Market with Daily Updates and Real-Time Analysis for Superior Market, Retailer and Consumer Insights. PR Newswire. Sep. 22, 2004.*
IRI bullish about 'Liquid Data'. Chain Drig Review, v30, n6, p3. Mar. 17, 2008. dialog file 04402604.*
Information Resources Inc. MMR, v24, n17, p54. Oct. 29, 2007 dialog file: 04333838.*
"U.S. Appl. No. 13/299,743 Non-Final Office Action mailed Apr. 4, 2013", 29 pages.
"U.S. Appl. No. 13/299,743 Notice of Allowance mailed Aug. 14, 2013", 15 pages.

* cited by examiner

*Primary Examiner* — Johanna Loftis
(74) *Attorney, Agent, or Firm* — Strategic Patents, P.C.

(57) ABSTRACT

Uncorrelated data from a variety of sources, such as consumer panels or retailer points of sale, are combined with maximal coverage of a universal data set for a population in a manner that permits useful inferences about behavioral propensities for the population at an individual or household level.

20 Claims, 6 Drawing Sheets

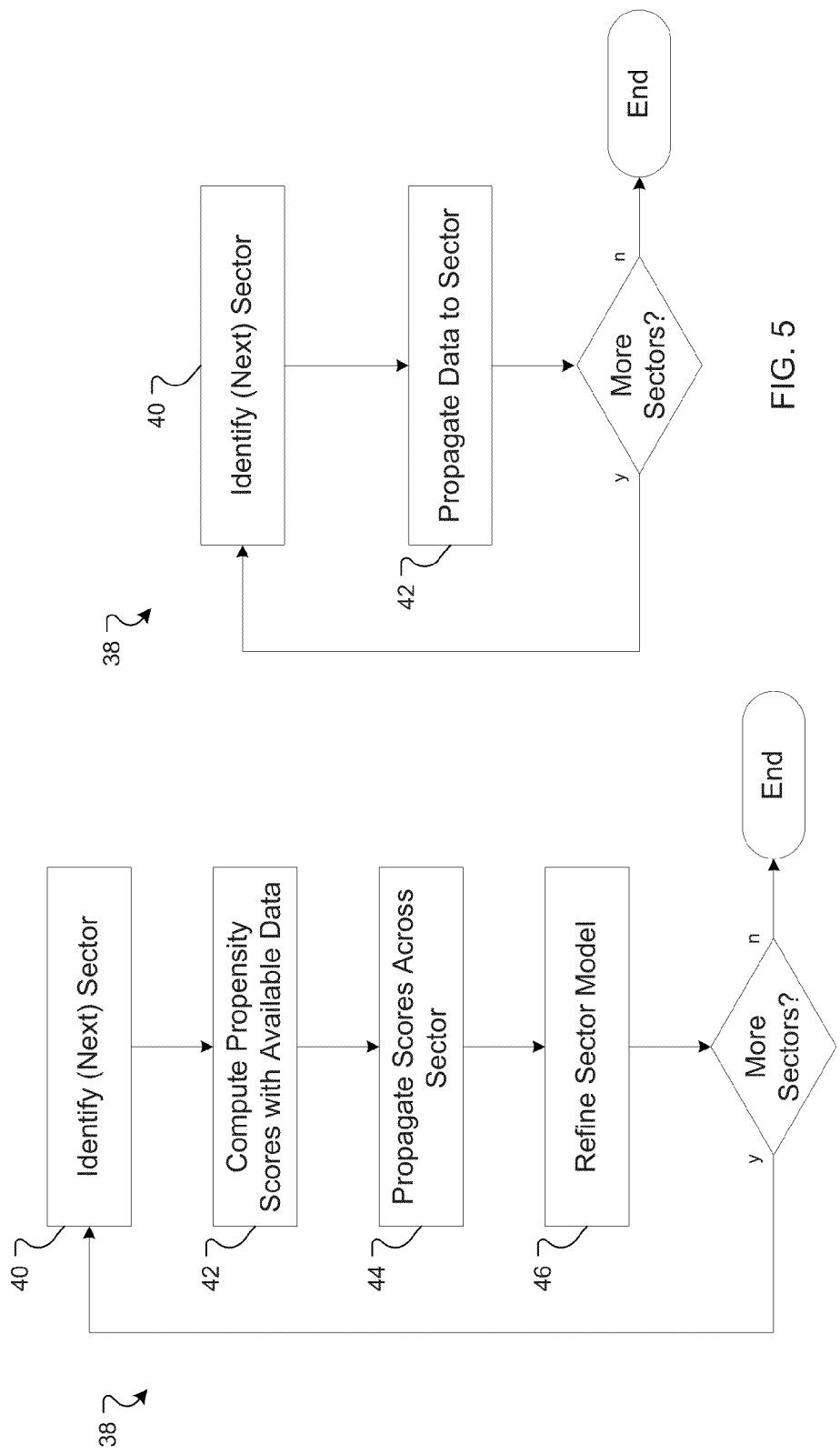

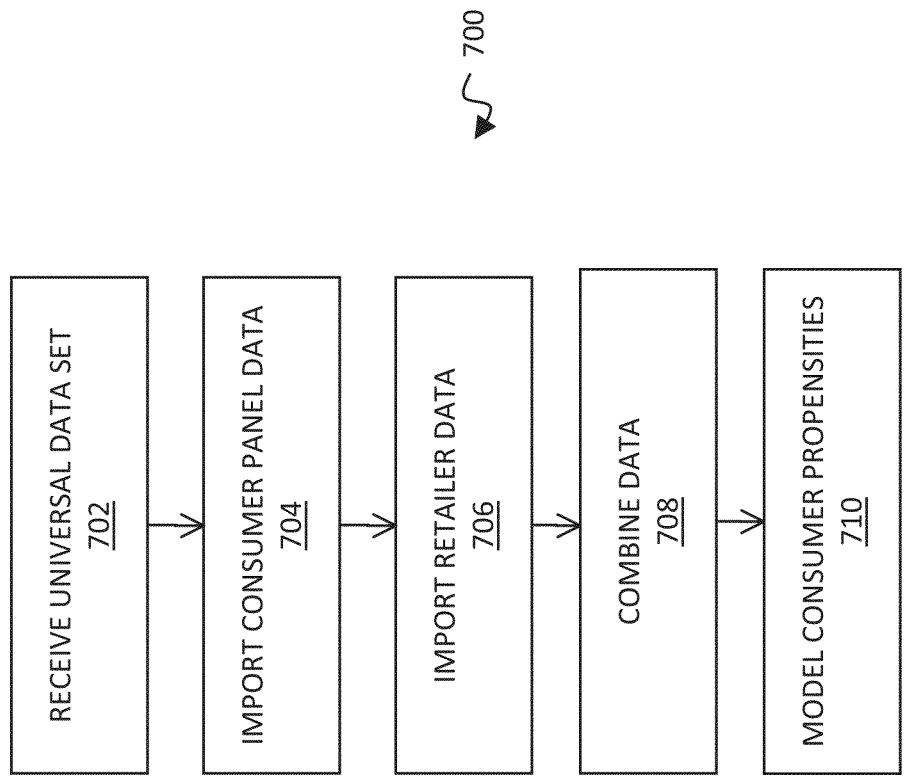

DATA INTEGRATION AND ANALYSIS

CROSS REFERENCE TO RELATED APPLICATIONS

This application is a continuation of U.S. patent application Ser. No. 13/299,743 filed Nov. 18, 2011, which claims priority to U.S. Patent Application 61/415,623, entitled Data Integration and Analysis, filed Nov. 19, 2010. The entirety of each of these application is hereby incorporated by reference herein.

BACKGROUND

Data is stored at a variety of locations and in a variety of forms. Data can be commercially relevant when it can be used to answer commercial questions (e.g., how is a product or product line performing in the market vs. its competitors, to what extent is a product or product line being adopted by a particular market segment, etc.). In turn, insight into these and other commercial questions can help one make business decisions intelligently.

SUMMARY

A method disclosed herein includes a computerized method for performing the steps of: identifying a universal data set enumerating a population of consumers within a geographic area; identifying a plurality of ancillary data sources that each provide ancillary data describing commercial behavior of a corresponding subset of consumers at the respective ancillary data source; partitioning the geographic area into a plurality of sectors; enumerating the plurality of sectors; identifying a sample of the plurality of sectors; extracting data from each of the ancillary data sources in an order consistent with an enumerated order of the cells until meeting data thresholds corresponding to each of the respective ancillary data sources; and combining the extracted data with panel data from a panel data source.

Implementations may include one or more of the following features. The ancillary data includes point of sale data. The ancillary data includes shipping data. The ancillary data includes media delivery data. The ancillary data includes credit card data. The ancillary data includes clickstream data. Enumerating the plurality of sectors includes identifying coordinates corresponding to each sector and interleaving digits of the coordinates, thereby producing an integer.

In general, in another aspect: identifying a data set including: characteristics of a population of consumers within a geographic area partitioned into sectors; ancillary data from at least two sources describing, on a sector-by-sector basis, consumer behaviors within the geographic area, wherein one of the sources is a panel data source; identifying a first propensity of consumers in a first sector to engage in a specified behavior with a first data source, by computing a ratio of a number consumers in the first sector who engage in the specified behavior to a total number of consumers in the first sector; identifying a modeled second propensity of consumers in the first sector to engage in the specified behavior with a second data source, wherein the data set does not include data sufficient to compute an actual second propensity corresponding to the modeled second propensity; using the first propensity and the modeled second propensity, identifying third and forth modeled propensities of consumers in a second sector to engage in the specified behavior with, respectively, the first and second data sources, wherein the data set does not include data sufficient to compute actual third and forth propensities corresponding to the modeled third and fourth propensities.

Implementations may include one or more of the following features. Identifying the modeled second propensity includes setting the second propensity equal to the first propensity. Identifying the modeled second propensity includes employing a shrinkage estimator. Identifying the modeled second propensity includes using an elasticity model describing propensity variation across data sources. Identifying the modeled second propensity includes using regression, imputation, projection, or similarity-based techniques. The specified behavior includes buying a particular brand of goods or services. The specified behavior includes consume media from a particular media outlet. The specified behavior includes a purchasing a specified collection of goods or services. The specified behavior includes purchasing at least a specified dollar amount worth of goods or services. The specified behavior includes shopping at a particular store. The specified behavior includes buying goods or services at a discount. Identifying the modeled third and fourth propensity includes regression, imputation, projection, or similarity-based techniques. Identifying the modeled third and fourth propensity scores includes verifying that the scores total to a known value.

In another aspect there is disclosed herein a computer program product embodied in a non-transitory computer readable medium that, when executing on one or more computing devices, performs the steps of: receiving a universal data set comprising geographic data for a plurality of customers within a geographic area, the universal data set having an order and the universal data set aggregated at a household level; importing consumer panel data according to the order of the universal data set, the consumer panel data including a number of customer-reported transactions for a first subset of the plurality of customers and the consumer panel data aggregated at an individual customer level; importing retailer data according to the order of the universal data set, until a predetermined threshold of a retailer for obtaining the retailer data from the retailer is achieved, the retailer data including customer data from the retailer for a second subset of the plurality of customers, wherein the second subset overlaps the first subset, and the retailer data aggregated at a retailer-provided level; and combining the consumer panel data and the retailer data according to the order of the universal data set at a normalized level of aggregation, thereby providing data set representative of the first subset of the plurality of customers and the second subset of the plurality of customers.

DESCRIPTION OF DRAWINGS

Features and advantages of the invention will be apparent from the following description of particular embodiments thereof, as illustrated in the accompanying drawings, wherein:

FIGS. 4 and 5 are flowcharts for data modeling.
FIG. 7 is a flowchart of a process for combining data sets.

DETAILED DESCRIPTION

Figure 1:
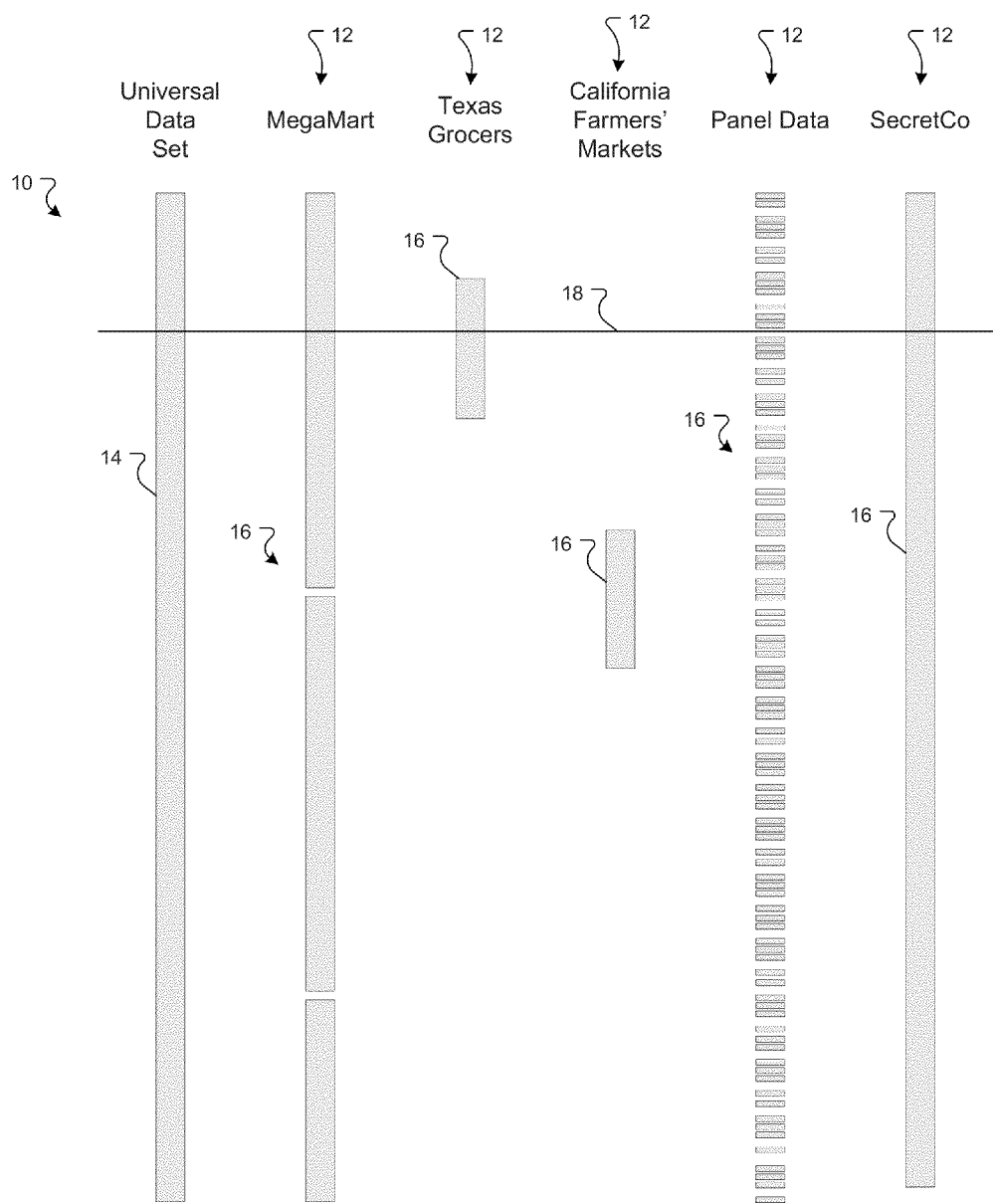
FIG. 1 is a schematic depiction of disparate data sets.

FIG. 1 is a schematic depiction of disparate data sets. As described more fully below, various data sets 10 are often available from many (though not all) market participants 12. The market participants can include any entity participating in a market (whether on the supply side or demand side), such as retailers, manufacturers, publishers, service providers, etc. Moreover, the term "market participant" includes third-party analysts or aggregators of market data in a particular market, even if they do not participate in that market themselves. For example, in FIG. 1, the "Panel" market participant denotes an organization that collects data from a group of consumers (e.g., by survey or other mechanism by which consumers self-report their behavior) without necessarily selling to or buying from the consumers. For purposes of illustration, the other market participants in FIG. 1 are MegaMart, Texas Grocers, California Farmers' Markets, and SecretCo. Illustrative aspects of these market participants and their corresponding data is explained in more detail below.

Each data set at least partially describes commercially relevant information about a population of consumers. Commercial relevance is a subjective characteristic. For example, a manufacturer of lawn mowers may not consider the average number of museum visits of a particular consumer to be commercially relevant piece of data. However, a magazine publisher who specifically targets museum-goers as potential subscribers may consider the same data to be highly commercially relevant. In general, if a particular piece of data can be used to bear on commercial issues (e.g., whether to develop one product vs. another, whether to advertise a product in a particular way or to a particular target audience, whether to expand retail operations into a particular geographic region or to exit a particular region, etc.) of a particular entity, then it is commercially relevant to that entity. Conversely, if a particular piece of data does not bear on any commercial issue of a particular entity, then it is not commercially relevant to that entity. In what follows, the adjective "commercially relevant" will be assumed to apply to all data sets 10 unless otherwise specified.

The commercially relevant information in the data sets 10 can include information about consumer behaviors, characteristics or attitudes.

A consumer behavior is any commercially relevant action that a consumer takes. For example, purchasing a particular product or combination of products, shopping at a particular store, shopping with a particular frequency, spending a particular amount of money, consuming media through a particular outlet (e.g., a particular television station, radio station, online media source, etc.), and visiting particular websites are all examples of consumer behaviors. Many other examples are possible.

A consumer characteristic is information about a consumer (or group of consumers). For example, a consumer's age, gender, location information (including physical locations such as address, zip code, census block, city, state, etc. and network locations such as an IP address), profession, income, shopping options, shopping location, etc. are all examples of consumer characteristics. An e-mail address, MAC address, or other computer-based characteristics are included in this term. Other characteristics are possible.

A consumer attitude is a belief or disposition that the consumer has on an issue. For example, consumer attitudes may be reflected by political affiliations, family values, lifestyle choices, etc. Often, consumer attitudes are determined via a survey, in which one or more questionnaires are presented to consumers to directly establish consumer attitudes. Other consumer attitudes may be inferred by consumer behavior. For example, one may infer that a particular consumer is vegetarian if that consumer purchases no meat at grocery stores or restaurants. Similarly, one may infer certain consumer attitudes based on the consumer's membership in particular organizations, contributions to particular charities, etc.

The data sets described above are often structured as a database or equivalent structure. That is, the data sets often have (or are capable of having) a hierarchical structure, in which several different pieces of data are associated with a particular consumer or group of consumers. Thus, e.g., a single record may be associated with the characteristics, behavior, or attitudes of a single consumer or group of consumers. In what follows, reference will be made to various database concepts (e.g., data in a certain record or field, categories or "dimensions" of data, etc.). However, this database-type language is employed for convenience, and the data sets 10 need not bear an explicit database structure.

In FIG. 1, it will be assumed that a universal data set 14 is available. The universal data set contains characteristic information on a relatively large number of consumers throughout a geographic area. In some implementations, the characteristic information includes location information (e.g., address, zip code, etc.) of the consumers. In some implementations, the characteristic information includes one or more of the characteristics listed in Appendix A.

In addition to the universal data set 14, one or more ancillary data sets 16 are also available. Each ancillary data set 16 includes (but is not limited to) information on consumer behaviors, as well as some degree of consumer characteristic information. The consumer characteristic information in the ancillary data sets 16 need not be represented the same level of specificity or granularity as the consumer characteristic information in the universal data set 14 in order to engage in meaningful analysis as described below. For example, if a consumer's location is described as an address in the universal data set 14, it is permissible to merely describe the consumer's zip code in an ancillary data set 16. Similarly, if the universal data set 14 describes only households, it is permissible for an ancillary data set 16 to describe a particular individual's (i.e., a household member's) consumer behavior.

The ancillary data sets 16 often come from the internal business records of market participants 12. For example, retail stores often keep records on each transaction made at the store, describing what item or items were purchased, what price was paid for each item, where the item or items were purchased (i.e., which of possibly several stores), etc. Moreover, many retail stores have "frequent shopper" or "loyalty" cards that allow the retailer to track the transaction details of individual consumers. Alternatively or additionally, credit card or debit card information can be used to track transactions. Various other sources of ancillary data exists, such as shipping or receiving records, manufacturing records, usage records of a particular resource, traffic records, including both physical traffic (as measured by, e.g., a counter at an entrance at a retail store) or network traffic (as measured from clickstream data reported, e.g., by a router or web server that provides content to a consumer), etc.

Market participants 12 often sell this data (after removing sensitive information of its consumers, such as full credit card numbers, etc) to third parties. However, some market participants 12 only release a relatively small proportion, typically on the order of 5% or 10% of the total data. Moreover, market participants 12 will often allow the third party to request specific transactions (e.g., transactions from a particular geography, transactions involving a certain dollar amount, etc.), subject to the limit on the total data to be released. Some market participants 12 will not sell even a small portion of their data to third parties.

In general, ancillary data sets 16 from different market participants may—but need not—overlap. In FIG. 1, this possibility is illustrated by the vertical placement of the data sets. Specifically, data sets that overlap on a common horizontal line are intended to describe consumer behaviors of the same consumer (or aggregated group of consumers) at the respective market participants. Thus, in the illustrative data of FIG. 1, at least some shoppers at MegaMart also shop at Texas Grocers, because the line 18 runs through both data sets. Conversely, the data reveals no consumer who shops at both Texas Grocers and California Farmers' Market, because there is no horizontal line between these data sets. Furthermore, note that both Texas Grocers and California Farmers' Market have relatively little data compared to the universal data set 14. Thus, if the universal data set 14 describes consumer characteristics throughout the United States, the data for Texas Grocers and California Farmers' Market is consistent with those stores doing business only in Texas and California, respectively.

Furthermore, the highly fractured nature of the sample panel data is consistent with data gathered by a survey in which only select individuals or groups of individuals were asked to participate or otherwise completed the survey. This is in contrast to the data of MegaMart and SecretCo. Almost all consumers in the universal data sample engage in some consumer behavior at MegaMart and SecretCo.

Directly analyzing the entire amount of available data is often challenging or unfeasible. One challenge is that the data sets 10 from different sources are often structured or formatted differently. For example, different market participants may report consumer characteristics at different levels of granularity. Moreover, even if each data set 10 were structured exactly the same, the sheer volume of the data can present challenges. For example, a universal data set 14 may describe as many as 116 million households, such as a list of all or substantially all the people or households in a large geographic area, such as the United States. (Here, the word "substantially" is used to acknowledge the fact that some people or households, in principle, may be unintentionally omitted from such a list, due to limitations in data gathering techniques.) Further still, market participants 12 often regard their data sets 16 as proprietary, and consequently will not make the entire data set available to third parties.

Figure 2:
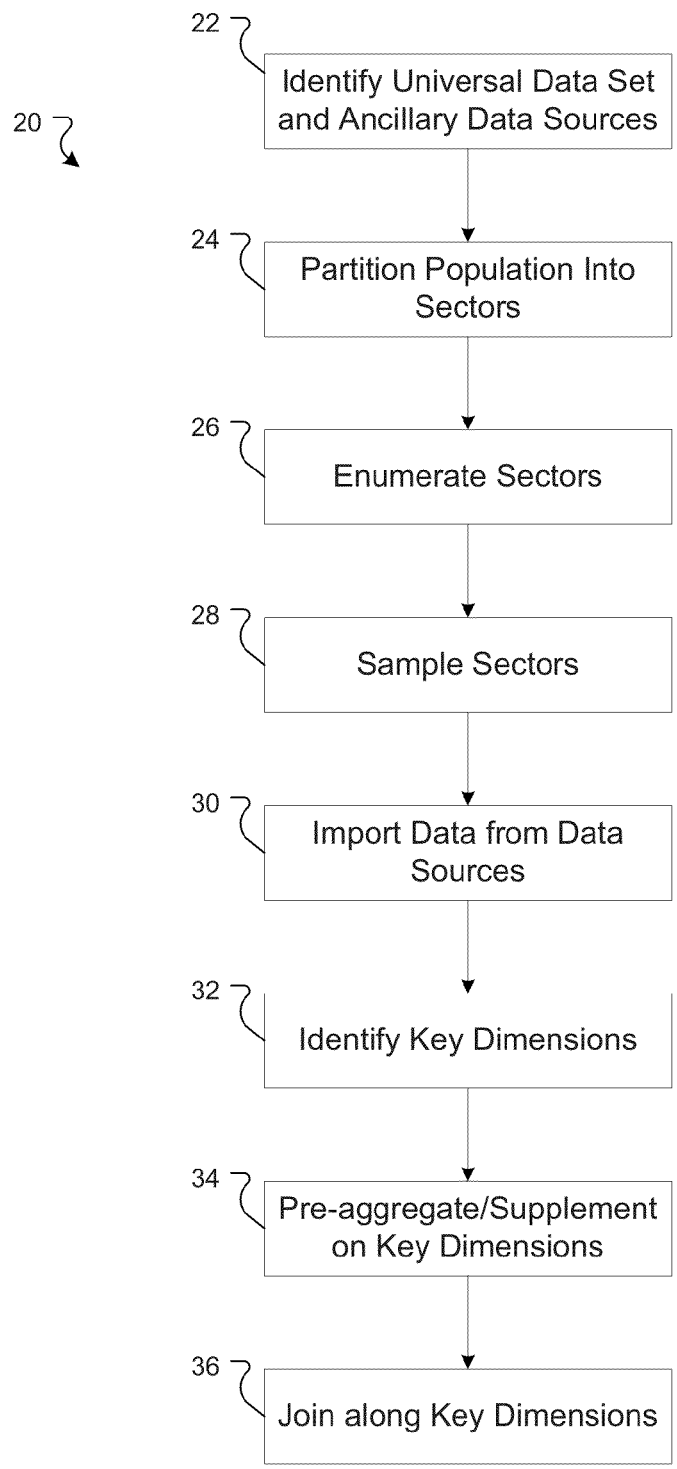
FIG. 2 is a flowchart for integrating and sampling data.

FIG. 2 is a flowchart for integrating and sampling data. The process 20 produces, from a variety of data sets 10, a data sample with desirable characteristics as described more fully below. The data sample produced by process 20 is typically smaller than the total available data, such that performing various analyses on the sample is feasible.

Process 20 begins by identifying a universal data set 14 and ancillary data sources (step 22). The universal data set describes characteristics of a population of consumers. Each ancillary source is a source of an ancillary data set 16 that describes (at least) one or more consumer behaviors. In some implementations, the ancillary data sources are market participants 12, and the consumer behaviors include behaviors at that particular market participant. At least two ancillary data sources are identified in step 22. In principle, there is no upper limit on the number of data sources that may be identified.

In step 24, the population of consumers of the universal data set is partitioned into non-overlapping sectors, according to a partitioning criterion. The partitioning criterion may include any shared characteristic of the consumers. For example, partitioning may performed by geographic area, last name, telephone number, etc. In the case of geographic areas, for example, one may partition the geographic area into households, streets, zip codes, census blocks, towns, states, etc. One may also partition the geographic area into irregular units according to an ad hoc partitioning scheme. In the case of last name, the population can be partitioned by providing alphabetical ranges; e.g., one partition may consist of consumers whose last name begins with the letter "A," another partition may consist of consumers whose last name begins with the letter "B," etc. Other partitioning criteria are possible. The partitioning criterion need not involve a single parameter or dimension (such as first letter of last name, etc.), but rather can involve two or more parameters or dimensions.

Partitioning the consumer population according to a criterion may have statistical consequences in the resulting data sample. For example, when partitioning by the first letter of the consumers' last name, it may happen that consumers with a particular ethnic background are over-represented or under-represented in partitions that begin with certain letters; e.g., consumers of Russian ethnicity may be under-represented in the partition of last names beginning with "H," because the letter "H" is rarely used as an initial letter in Russian-to-English transliteration. In some implementations, the choice of a partitioning criterion may involve the subjective judgment of one or more people responsible for partitioning.

In some implementations, a partitioning criterion that is relatively stable selected. A criterion is stable if it is unlikely to change for a particular consumer. For example, a consumer's last name is relatively stable, insofar as men's last names typically do not change, and women's last names typically only change after a marriage, which typically occurs only a relatively few number of times in a woman's life. By contrast, a consumer's annual income is less stable, insofar as a consumer's annual income often changes, if only slightly, every year.

In step 26, the sectors are enumerated. Any enumeration of sectors is permissible. In some implementations, the sectors are enumerated by a random assignment of numbers to sectors. For multi-dimensional partitioning criteria or criteria that involve several parameters, in some implementations, the sectors can be enumerated by first enumerating the individual dimensions or parameters, and then interleaving the parameters to produce a one-dimensional list. For example, in some implementations in which the partitioning criterion involves a geographic location, two dimensional coordinates (e.g., latitude/longitude or other coordinate system) can be assigned to each sector, and then the digits of the coordinates can be interleaved. The assignment of coordinates can be performed in any manner; e.g., associating a sector with its geometric center, centroid, barycenter, an extremal point, or some other preferred point in the sector. For example, if the coordinates of a sector are (abc, ABC), where each of a, b, c, A, B, and C are digits of the respective coordinates, then that sector can be enumerated as the number aAbBcC obtained by interleaving the coordinates. In some implementations, the coordinates are expressed in binary.

Once the sectors are enumerated, a subset of sectors is identified (step 28). The subset may be identified by any method. For example, a subset can be identified by a statistical sampling scheme, such as by selecting sectors according to a probability distribution. Similarly, a subset may be identified by systematic sampling—i.e., selecting sectors at fixed, regular intervals (e.g., including every thousandth sector in the sample), etc. The subset need not be a proper subset—i.e., the subset can include the entire list of sectors. In general, the manner in which the subset of sectors are identified may be decided in light of statistical, logistic, or other consequences, and therefore may involve the subjective judgment of one or more people responsible for performing the sampling. In some implementations, the subset of sectors is chosen to be contained within sectors for which pre-determined data is available. For example, the subset of sectors can be chosen to be contained within sectors for which panel participants are present.

Once the sample of sectors is determined, data is imported from the data sources (step 30). As mentioned above, some data sources will only release a certain proportion (i.e., 5% or 10%) of their available data. Some data sources will allow this proportion of data to be selected according to customer-specified preferences. In this case, in some implementations, the data is imported on a sector-by-sector basis, in the sectors' enumerated order, until source-imposed threshold (e.g., 5% or 10%) is met.

In some implementations, one may have external knowledge (e.g., knowledge from a source other than an ancillary data source 16) that particular data is not available from a particular source in a particular sector. For example, in some implementations in which the sectors are geographic sectors, one may have external knowledge that a particular retailer does not do business outside of California. Consequently, no data will be available from that retailer in sectors that lie outside of California. In some implementations, the externally-known data may be used to augment the data sample. Thus, in some implementations, sectors for which external data is available may be omitted in step 30 described above. This may provide an advantage, since externally-obtained data does not count towards the total of data released directly by the data source.

In step 32, one or more key dimensions are identified. A "key dimension" is a type of data that is common among two or more data sets. For example, if two data sets describe consumers' addresses and purchases at two stores, then "address" is a key dimension.

Identifying a key dimension may require supplementing one or more data sets. For example, if one data set includes the location of a consumer and another data set includes the consumer's IP address, then apparently there is no available key dimension. However, one may associate an IP address with a location using geolocation techniques. Thus, one may supplement the IP address data with location data, to identify location as a key dimension.

Similarly, two data sets may include the same type of information at different levels of specificity or granularity. For example, one data set may describe consumers' locations as an address, while another data set may describe consumers' location as a zip code. When this occurs, one may select the zip code as a key dimension, but aggregate the locations in the first data set from the address level to the zip code level.

In any case, the data is aggregated and/or supplemented, if necessary, so that it reflects consumer behaviors, characteristics, or attitudes on a sector-by-sector basis (step 34).

After supplementing and/or aggregating the data sets if necessary, the data sets may optionally be combined along the key dimension(s) into a single data set (step 36). For example, the combination may be (but need not be) implemented using the traditional "join" operation on databases. Another implementation may be to simply include pointers from one data set to the others, indicating the appropriate relationships amongst the data. Other implementations are possible.

Figure 3:
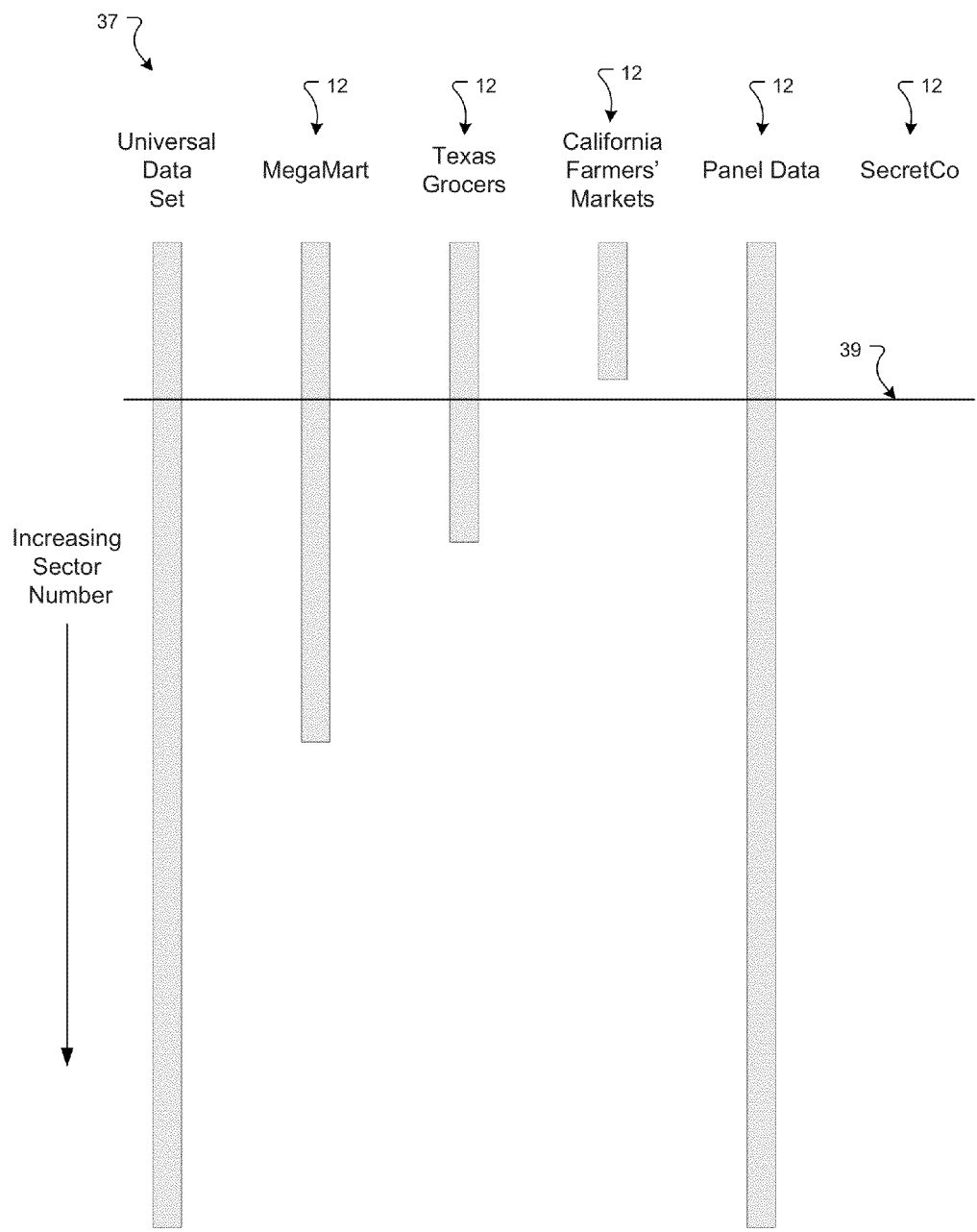
FIG. 3 is a schematic depiction of integrated data sets.

FIG. 3 shows an exemplary data sample 37 that is produced from process 20. The sample 37 has the property that the available data from the various ancillary data sets for a particular sector is a non-decreasing function of the sector number. That is, the data is "nested," in the sense that if the sampled data set contains data from a particular ancillary data source in sector N, then the data sampled data set also contains data from that ancillary data source in sectors M, for all M<N. Moreover, if the sampled data set contains data from a different ancillary data source in sector N', where N'<N, then the sampled data set also contains data from that ancillary data source in sectors M', for all M'<N'. Thus, for all sectors up to N', information is available for both ancillary data sources. For all sectors N'+1 through N, information is available for only the first source, and is known not to be available from the second source. Said another way, the nesting property provides a structure such that that data from the various data sources is simultaneously available for the maximal number of sectors.

Having data simultaneously available from numerous data sources for a particular geographic sector allows certain types of inferences to be made. Consider, for example, the geographic sector corresponding to the line 39 in FIG. 3, in which data is available from both MegaMart and Texas Grocers. If the data from Texas Grocers indicates that a particular consumer has a loyalty card, but MegaMart's data does not reveal a corresponding loyalty card, then it can be inferred that the consumer does not shop at MegaMart. (Such an inference rests on the assumption that those who regularly shop at a store hold a loyalty card at that store.)

Similarly, if the data from Texas Grocers indicates that a particular consumer has a loyalty card, and MegaMart's data also reveals a loyalty card belonging to the same shopper, then the extent to which Texas Grocers and MegaMart provide competing or complementary behavior can be assessed. For example, the data could reveal that the chains could fully overlap (i.e., similar consumer behavior in both chains), or large trips made to Texas Grocers and small trips made to MegaMart, or food bought at Texas Grocers and health and beauty aids bought at MegaMart, among many potential possible behaviors.

If this behavior were assessed with two random 10% samples from each of MegaMart and Texas Grocers, the sample overlap would typically be 1% of the total sampled data. Using the techniques described herein, however, the overlap will be much higher—in theory 100% if everyone had cards from both retailers and the keying information was completely accurate.

Note that this inference could not accurately be made if the data sets did not overlap (or were not known to overlap) on that sector. That is, if a loyalty card for a particular consumer is not included in a particular data set from a retailer, then all one can infer is either that the consumer does not shop at the retailer, or that the consumer is not included in the sampled data. But in the case of nested data sets, if a consumer behavior is described in any single data set (or if the consumer is described in the universal data set), the consumer's absence in other data sets contains information that the consumer actually did not engage in behavior described by the other data sets, not merely that the other data sets are silent as to the consumer's behavior.

More generally, several other negative inferences can be made from different data sets that overlap on a sector. A "negative inference" is an inference that a consumer does not engage in a particular behavior, based on a) observing a lack of evidence for the particular behavior, and b) observing evidence to support the inference that, if the consumer had engaged in the particular behavior, there would be evidence of it. In nested data sets, condition b) is satisfied when data sets overlap on a particular sector.

In addition to enhancing the opportunity to make negative inferences, the structure of the data sample produced by process 20 has other desirable properties. For example, the data sample is easily updatable in the event two or more data sources merge. For example, if MegaMart merges with Texas Grocers to form a new retailer called BrandNewMart, then creating a data sample for BrandNewMart can be accomplished by combining the MegaMart/Texas Grocers data in relatively straightforward ways—e.g., by adding numerical data such as sale volume, amount, etc., or by aggregating and eliminating redundant non-numerical data such as loyalty card data. In particular, because the data sample is nested, no additional work need be done to account for the possibility that the MegaMart data is potentially based on a different sample than the Texas Grocer data.

Similarly, the data sample of process 20 is amenable to changing degrees of aggregation. For example, retailers typically have their own privacy policies through which personally identifying information is removed from data before it is provided to third parties. One common technique for removing personally identifying information is to aggregate information on a geographic or other basis. If a retailer modifies their privacy policy resulting in a change to the level of aggregation of reported data, the then the corresponding sectors of the data sample can be similarly aggregated, resulting in the continued usefulness of the data sample.

This data set can be used to gain insight into market-related questions.

For example, one class of questions involves ascertaining, predicting, or otherwise modeling the propensity that a consumer or group of consumers will behave in a certain way. For example, one might want to know the propensity of a group of consumers to buy one brand of detergent vs. another brand, or the propensity to buy a high-end version of a product vs. a low-end version, or the propensity to buy a given product at all, or the propensity to spend at least a certain amount of money buying a certain type of product or products. Generally, one may inquire about consumers' propensity to engage in virtually any measurable behavior, which may be quantified as a propensity score or the like indicative of a tendency of a consumer or group of consumers to engage in a specific behavior.

Given the data set derived from process 20, there will often be some consumers for whom a desired propensity can be directly calculated from available data. For example, if point of sale ("POS") data is available from MegaMart for particular geographic sector, then questions such as those above can be directly calculated using traditional techniques, at least as those propensities relate to MegaMart behaviors. (E.g., one may calculate the propensity of a consumer to engage in a particular behavior at MegaMart.)

Similarly, if other data sources are available for the same sector, then propensity scores can be refined by the additional data. This can occur according to several mechanisms. In one instance, merely having more data often results, as a general statistical matter, in increased accuracy in any conclusions made from the data.

Additionally, with sufficient data, one may make inferences by process of elimination or other exclusionary inferences. For example, suppose a particular geographic sector has exactly three stores that sell a certain product. If one has point of sale data from two of the stores, and one knows the total amount of money spent on that product, then one may infer the amount of money spent on the product in that sector by subtracting the known amounts from the total.

FIG. 4 is a flowchart for analyzing an integrated data set. The analysis process 38 may be carried out on a data set describing a population of consumers in a geographic area, including two or more ancillary data sets describing consumer behavior on a geographic sector-by-sector basis. In some implementations, the analysis process 38 may be carried out on the output of process 20. In step 40, such a data set is identified, as is an initial sector in the data set.

In step 42, propensity scores are directly computed for those cells for which data is available. A "cell" is the data in a particular ancillary data set for a particular sector. When data is available, a general formula for computing a propensity score is to compute ratio of consumers in the cell who exhibit the behavior to the total number of consumers in the cell. Other ratios can be computed that yield scores that provide equivalent information; i.e., the ratio of consumers who exhibit a particular behavior to the consumers who do not exhibit the behavior. Similarly, these or other ratios may be scaled (i.e., linearly scaled, logarithmically scaled, geometrically scaled, exponentially scaled, etc.) and still provide the same information.

In general, there will be cells for which data is unavailable from any ancillary data source. For example, in FIG. 3, no data is available from SecretCo, illustrating the scenario in which SecretCo does not release any of its data. For these cells a modeled propensity score can be determined in a variety of ways. One simple way is to set the modeled propensity score equal to a computed propensity score from another cell for which data is available. Similarly, a modeled propensity score can be determined as a combination (e.g., average, weighted average, etc.) of computed propensity scores. More sophisticated techniques, such as regression models, gravity models, projection techniques, etc. may be used. Moreover, in these or other techniques, the availability of making negative inferences is enhanced by the nested configuration of the data sample.

In step 44, propensity scores are propagated from cells in which scores were calculated to cells for which no data was available using these techniques. Thus, after step 44, all the cells in a particular sector contain propensity information, either directly calculated from other data from the cell, or modeled based on other propensity scores.

In step 46, the propensity data in the sector can be refined. Such refinements can implement global aspects of modeling that were not (or cannot be) implemented in the cell-by-cell modeling. For example, stability enhancing techniques can be applied to the data in step 46. Stability enhancing techniques include applying a hierarchical weighting scheme, a shrinkage estimator (e.g., inverse Bayesian shrinkage), or the like. The specific stability enhancing techniques are applied and/or tuned on a case by case basis depending on the particular data sets involved.

FIG. 5 is a flowchart for analyzing an integrated data set. In process 48, a data set is identified that describes a population of consumers in a geographic area partitioned into sectors, and a number of ancillary data sources. Moreover, for a given sector, there is either a computed or modeled propensity score for the consumers in at least one sector to engage in a particular behavior at each of the data sources. For example, the process 48 can operate on the output of process 38.

In step 50, a data set is identified, along with those sectors for which propensity data is available. In step 52, the propensity data is propagated to those sectors for which no propensity data is available, using traditional mathematical modeling techniques (e.g., regression, similarity, projection, gravity models, etc.)

The processes 38 and 48 are illustrative of a larger class of analyses. That is, starting with the data sample produced by process 20, some analytic item of interest (e.g., propensity scores) can be computed for some cells, and then modeled for those cells for which no data is available. This general approach can be followed to compute, model, or otherwise gain insight into virtually any analytic question about consumer behaviors, including shared wallet estimation, market segmentation, etc. However, following such an approach using a more-nested data sample vs. a less-nested sample allows for a greater number (or higher quality) of negative inferences to be made during some or all of the modeling, ultimately leading to enhanced accuracy.

Figure 6:
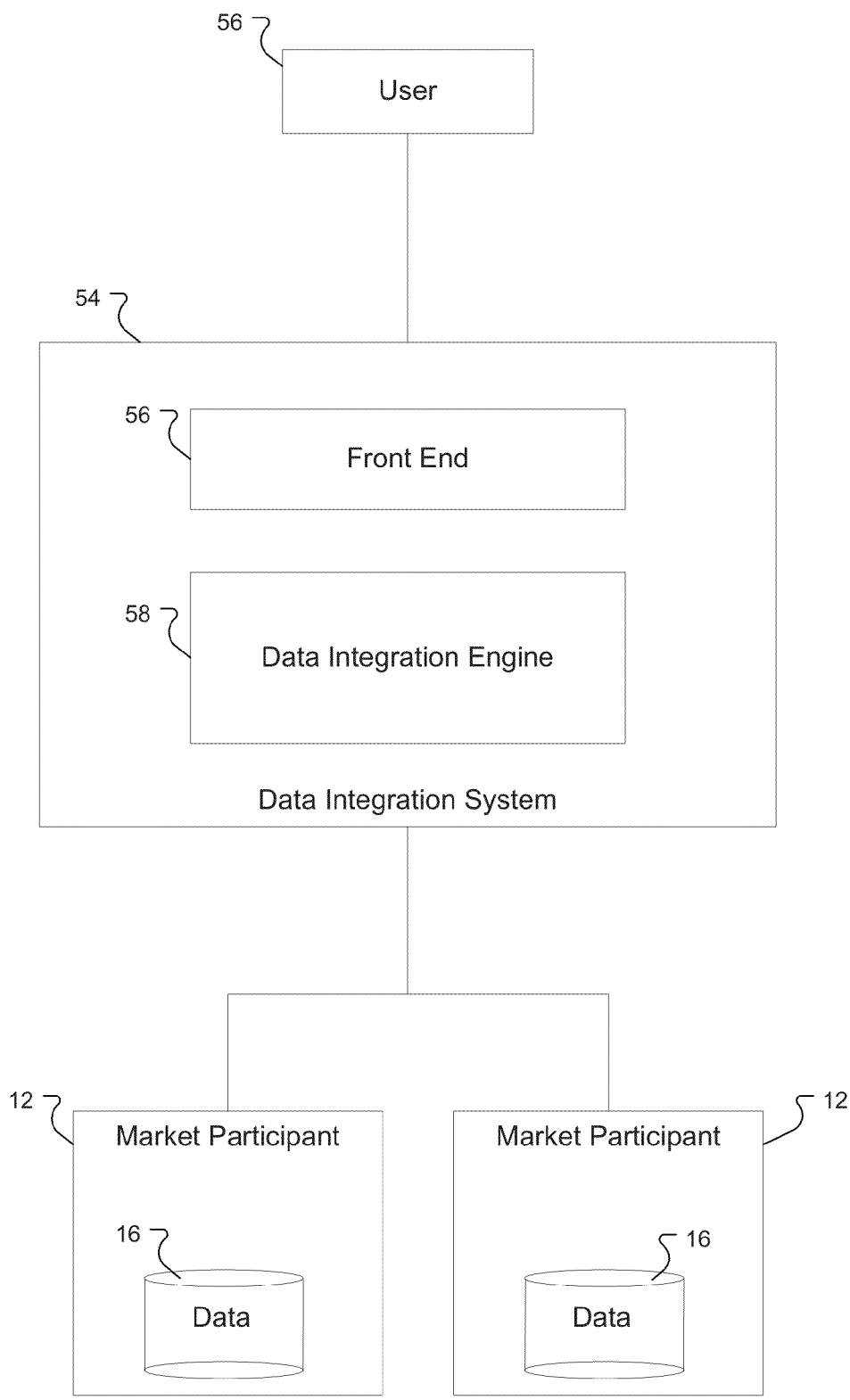
FIG. 6 is a block diagram for a data integration system.

FIG. 6 is a block diagram of a data integration system. The data integration system 54 includes a front end 56, a data integration engine 58, a data analysis engine 60, and a data store 62. The data integration system 54 is in data communication with one or more users 64, and in data communication with one or more market participants 12. The data communication can be implemented in any fashion, including by direct physical connection, wireless communication, or indirect communication through a computer network such as a local area network or a wide area network such as the Internet.

The data integration engine 54 is operable to identify various ancillary data sources 16 from the various market participants 12 and integrate them. For example, the integration may include performing process 20, thus producing a data sample. The data store 62 is operable to store data needed by the data integration system. For example, the data store 62 may store the data sample produced by the data integration system. The data analysis engine is operable to perform various analyses on the data in the data store, such as the analyses of processes 38 and 48, among others.

The front end 56 is operable to interface with one or more users 62, and to allow the users to conveniently interact with the data integration system 54. Through the front end, the users may cause the system to perform various analyses, view or manipulate the data sample, or export data or analytic results to external systems.

In some implementations, each user 64 is associated with a user profile. The user profile includes information such as a user name, password, permissions, etc. In some implementations, the user profile is stored in the data store 62. In some implementations, the front end 56 presents options to the user based on the user's permissions or other information in the user's profile. For example, some users 56 have "read only" permissions for certain data, in which case the front end 56 will suppress functionality that involves writing to that data. Similarly, to maintain confidentiality, read permissions associated with individual market participants 12 may be assigned to different users.

FIG. 7 is a flowchart of a process 700 for combining data from disparate data sets using the techniques described above.

As shown in step 702, the process 700 may begin with receiving a universal data set comprising geographic data for a plurality of customers within a geographic area, the universal data set having an order and the universal data set aggregated at a household level. This may for example include phone-book type data for a geographic area organized according to residential address, or any other similar data set from any commercial or non-commercial source. The data may be received, e.g., by downloading data from an online commercial provider, or otherwise creating a local copy of the data in the data set from a disk or other computerized or written sources in any suitable manner.

As shown in step 704, the process 700 may include importing consumer panel data according to the order of the universal data set. This may, for example, be obtained from an online commercial source acquires and sells data concerning individual consumer purchasing behavior or the like. The consumer panel data may include a number of customer-reported transactions for a first subset of the plurality of customers and the consumer panel data may be aggregated at an individual customer level. This may, for example, include data concerning individual consumer behavior gathered by a commercial service based upon voluntary consumer participation, or any other data that similarly represents purchasing activity on an individual consumer basis.

As shown in step 706, the process 700 may include importing retailer data according to the order of the universal data set. In general, the retailer data may include customer data from a retailer for a second subset of the plurality of customers that overlaps the first subset of customers from the consumer panel data set. The retailer data may, for example, be aggregated at any retailer-provided level, such as a store, customer, household, credit card, or other level. This may include any data that is gathered by a retailer in the course of doing business. By way of example and not limitation, the retailer data may include point of sale data for stores operated by the retailer. The retailer data may include clickstream data obtained from online purchases. This may include shipping data for products shipped by the retailer to individual customers or the like. This may also or instead include media delivery data, such as where a retailer sells media including movies, music, games, software, and so forth, either online or in stores or some combination of these. This may also or instead include credit card data relating to any/all credit card purchases made with the retailer. More generally, any data from the retailer relating to actual purchases made by specific customers may be included in the retailer data as that term is used herein. The retailer data may be imported until a predetermined threshold of a retailer for obtaining the retailer data from the retailer is achieved, such as an explicit limit on the quantity of data that the retailer is willing to provide.

As shown in step 708, the method may include combining the consumer panel data and the retailer data according to the order of the universal data set at a normalized level of aggregation, thereby providing a data set representative of the first subset of the plurality of customers and the second subset of the plurality of customers. This operation is described in greater detail above, and when so combined, provides a basis for drawing inferences about characteristics and behavior of the more general population in the universal data set for a geographic area.

As shown in step 710, with the data combined in this manner, consumer propensities may be modeled for customers in the universal data set according to the data set representative of the first subset of the plurality of customers and the second subset of the plurality of customers. This may include consumer propensities for any specific behavior for consumers. By way of example and not limitation, this may include a propensity for buying a particular brand of goods or services, or a propensity for purchasing a specified collection of goods or services. This may also or instead include a propensity for spending a certain dollar amount worth of goods or services, such as at least one hundred dollars, or not more than twenty dollars. This may also include (for media purchases), a propensity for consuming media from a particular media outlet, or of a particular format or type. This may also or instead include a propensity for shopping at a particular retailer, or at a particular store. Other propensities may similarly be measure, such as a propensity for buying goods or services at a discount, or a tendency to respond or not respond to any other types of promotions, coupon sources, and so forth.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In some embodiments disclosed herein are computer program products comprising computer-executable code or computer-usable code that, when executing on one or more computing devices (such as the devices/systems described above), performs any and/or all of the steps described above. The code may be stored in a non-transitory computer readable medium such as a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The meanings of method steps of the invention(s) described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

Thus for example, a description or recitation of "adding a first number to a second number" includes causing one or more parties or entities to add the two numbers together. For example, if person X engages in an arm's length transaction with person Y to add the two numbers, and person Y indeed adds the two numbers, then both persons X and Y perform the step as recited: person Y by virtue of the fact that he actually added the numbers, and person X by virtue of the fact that he caused person Y to add the numbers. Furthermore, if person X is located within the United States and person Y is located outside the United States, then the method is performed in the United States by virtue of person X's participation in causing the step to be performed.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

APPENDIX A

| Element | Description |
|---|---|
| | SUMMARY |
| 8640 | NUMBER OF SOURCES |
| | AGE |
| 8600 | Adult Age Ranges Present in Household |
| 8616 | Age in Two-Year Increments - $1^{st}$ Individual |
| 8623 | Date of Birth - Input Individual (YYYY/MM) |
| 8626 | Age in Two-Year Increments - Input Individual |
| | BEHAVIOR |
| 2066 | Gambling - Behavior |
| 2067 | Investments - Active - Behavior |
| 3410 | Charitable Giving Score |
| | BUYING ACTIVITY |
| 2019 | Young Men's Apparel |
| 2021 | Young Women's Apparel |
| 2022 | Apparel - Women's - C |
| 2025 | Automotive, Auto Parts & Accessories - SC |
| 2032 | Jewelry - SC |
| 6136 | Apparel - Big & Tall - C |
| 6137 | Apparel - Children's - C |
| 6139 | Apparel - Men's - C |
| 6141 | Apparel - Women's - Petite - C |
| 6142 | Apparel - Women's - Plus Sizes - C |
| 6150 | Arts & Antiques - Antiques - C |
| 6151 | Arts & Antiques - Art - C |
| 6199 | Books & Magazines - Magazines - C |
| 6200 | Books & Music - Books - C |
| 6201 | Books & Music - Books - Audio - C |
| 6249 | Children's Apparel - Infants & Toddlers |
| 6252 | Children's Learning & Activity Toys |
| 6254 | Children's Products - General - Baby Care - C |
| 6255 | Children's Products - General - Back-to-School - C |
| 6281 | Computing/Home Office - General |
| 6313 | Donation/Contribution - C |
| 6314 | DVDs/Videos - C |
| 6330 | Electronics & Computing - TV/Video/Movie Watcher - C |
| 6331 | Electronics, Computing & Home Office - SC |
| 6380 | Gardening - C |
| 6425 | Health & Beauty |
| 6455 | High End Appliances - C |
| 6456 | Children's Products - General - SC |
| 6484 | Home & Garden |
| 6518 | Hunting |
| 6519 | Intend to Purchase - HDTV/Satellite Dish |
| 6520 | Intend to Purchase - Home Improvement |
| 6537 | Lifestyles, Interests & Passions - Collectibles - C |
| 6538 | Lifestyles, Interests & Passions - Crafts/Hobbies - C |
| 6555 | Luggage |
| 6556 | Magazines |
| 6579 | Membership Clubs |
| 6604 | Method of Payment Count - Cash |
| 6605 | Method of Payment Count - Credit Card |
| 6610 | Method of Payment Count - Retail Card |
| 6612 | Military Memorabilia/Weaponry |
| 6620 | Musical Instruments |
| 6703 | Off-road Recreational Vehicles |
| 6740 | Pets - SC |
| 6742 | Photography & Video Equipment - C |
| 6793 | Sports & Leisure - SC |
| 6805 | Telecommunications - SC |
| 6819 | Travel - C |
| 6827 | Value-Priced General Merchandise - SC |

APPENDIX A-continued

| Element | Description |
|---|---|
| 8177 | MAIL ORDER DONOR |
| 8615 | MAIL ORDER BUYER |
| 8620 | MAIL RESPONDERS |
| 8621 | CREDIT CARD INDICATOR |
| 8653 | ONLINE PURCHASING INDICATOR |
| 8693 | CREDIT CARD USER |
| 8808 | NEW BANK CARD |
| 8815 | PRESENCE OF BANK CARD |
| 8816 | NUMBER OF CREDIT LINES |
| 8836 | RANGE OF NEW CREDIT |
| 9152 | RETAIL ACTIVITY - DATE OF LAST ACTIVITY |
| 9153 | Retail Purchases - Categories |
| 3412 | Life Insurance Purchase Propensity |
| 3411 | Vacation Property Ownership Propensity |
| | ETHNICITY |
| 2102 | Ethnicity - African American Professionals |
| | FINANCIAL |
| 8337 | HIGHLY LIKELY INVESTORS |
| 8339 | LIKELY INVESTORS |
| 8641 | ESTIMATED INCOME CODE |
| 8671 | ESTIMATED INCOME CODE (NARROW RNG) |
| 3406 | Discretionary Income Score |
| 3408 | Home Market Value Model |
| 3409 | Income Range Broad |
| 3407 | Income Range Premium |
| 3436 | Discretionary Income Index |
| | HEALTH RELATED |
| 2200 | Health - Allergy Related |
| 2201 | Health - Arthritis/Mobility |
| 2203 | Health - Diabetic |
| 2204 | Health - Disabled Individual in the Household |
| 2207 | Health - Orthopedic |
| 2208 | Health - Senior Needs |
| | HOUSEHOLD |
| 2356 | Veteran in the Household |
| 7602 | Children - Number in Household - Complete & INDICATOR |
| 7607 | Length of Residence - Complete & INDICATOR |
| 7622 | Children - Presence in Household - Complete & INDICATOR |
| 8082 | SOHO Indicator |
| 8487 | Voter/Party - 1st Individual |
| 8601 | Children's Age Ranges Present in Household |
| 8602 | Children - Number in Household |
| 8603 | Children's Age - 1 Year Increments (must have signed privacy agreement) |
| 8604 | Occupation - 1st Individual |
| 8609 | Marital Status in the Household |
| 8614 | Base Record Verification Date |
| 8619 | Working Woman |
| 8622 | Children - Presence in Household |
| 8628 | Adults - Number in Household |
| 8629 | Household Size |
| 8652 | Generations - Number in Household |
| 8680 | Adult - Presence of Young Adult |
| 8692 | Adult - Presence of Senior Adult |
| 9509 | Education - 1st Individual |
| 9780 | eMail Append Available Indicator |
| 2351 | Adult - Single Parent with child(ren) |
| 2403 | Congressional District |
| | INDIVIDUAL |
| 8637 | Occupation - Input Individual |
| 8688 | Gender - Input Individual |
| 9514 | Education - Input Individual |
| 8531 | Voter/Party - Input Individual |
| | INTEREST |
| 7719 | Wireless Product Buyer |
| 7720 | Fashion - Interest |
| 7721 | History/Military - Interest |
| 7722 | Smoking/Tobacco - Interest |
| 7724 | Current Affairs/Politics Interest |
| 7725 | Theater/Performing Arts - Interest |
| 7726 | Community/Charities - Interest |
| 7727 | Religious/Inspirational - Interest |
| 7728 | Science/Space - Interest |
| 7730 | Career Improvement - Interest |
| 7731 | Food - Wines - Interest |
| 7732 | Arts - Interest |
| 7733 | Reading - General - Interest |
| 7735 | Reading - Religious/Inspirational - Interest |
| 7736 | Reading - Science Fiction - Interest |
| 7737 | Reading - Magazines - Interest |
| 7738 | Reading - Audio Books - Interest |
| 7739 | Cooking - General - Interest |
| 7740 | Cooking - Gourmet - Interest |
| 7743 | Foods - Natural - Interest |
| 7744 | Travel - U.S. - Interest |
| 7745 | Travel - Foreign - Interest |
| 7746 | Recreational Vehicles - Interest |
| 7748 | Travel - Cruise Vacations - Interest |
| 7750 | Exercise - Running/Jogging - Interest |
| 7751 | Exercise - Walking - Interest |
| 7752 | Exercise - Aerobic/Cardiovascular - Interest |
| 7753 | Crafts - Interest |
| 7754 | Photography - Interest |
| 7755 | Aviation - Interest |
| 7756 | Auto Work/Mechanics - Interest |
| 7757 | Sewing/Knitting/Needlework - Interest |
| 7758 | Woodworking - Interest |
| 7759 | Games - Board Games/Puzzles - Interest |
| 7760 | Music - Home Stereo - Interest |
| 7761 | Music Player - Interest |
| 7762 | Music Collector - Interest |
| 7763 | Music - Avid Listener - Interest |
| 7764 | Movie Collector - Interest |
| 7765 | TV Reception - Cable - Interest |
| 7766 | Games - Video Game Console - Interest |
| 7769 | TV Reception - Satellite Dish - Interest |
| 7770 | Health/Medical - General - Interest |
| 7771 | Dieting/Weight Loss - Interest |
| 7772 | Self Improvement - Interest |
| 7773 | Pets - Cats Owner - Interest |
| 7774 | Pets - Dog Owner - Interest |
| 7775 | Pets - Other - Interest |
| 7776 | House Plants - Interest |
| 7777 | Parenting - Interest |
| 7779 | Children's Interests - Interest |
| 7780 | Grandchildren - Interest |
| 7781 | Spectator - Racing - Auto/Motorcycle - Interest |
| 7782 | Spectator - Football - Interest |
| 7783 | Spectator - Baseball - Interest |
| 7784 | Spectator - Basketball - Interest |
| 7785 | Spectator - Hockey - Interest |
| 7786 | Spectator - Soccer - Interest |
| 7787 | Spectator - Tennis - Interest |
| 7788 | Collectibles - General - Interest |
| 7789 | Collectibles - Stamps - Interest |
| 7790 | Collectibles - Coins - Interest |
| 7791 | Collectibles - Arts - Interest |
| 7792 | Collectibles - Antiques - Interest |
| 7793 | Investments - Personal - Interest |
| 7794 | Investments - Real Estate - Interest |
| 7795 | Investments - Stocks/Bonds - Interest |
| 7796 | PC - Interest |
| 7799 | Games - PC Game Player - Interest |
| 7801 | Electronics - Consumer Electronics - Interest |
| 7802 | Outdoor - Fishing - Interest |
| 7803 | Outdoor - Camping/Hiking - Interest |
| 7804 | Outdoor - Hunting/Shooting - Interest |
| 7805 | Outdoor - Boating/Sailing - Interest |
| 7807 | Outdoor - Scuba Diving - Interest |
| 7808 | Outdoor - Biking/Mountain Biking - Interest |
| 7809 | Environmental Issues - Interest |
| 7810 | Participant - Tennis - Interest |
| 7811 | Participant - Golf- Interest |
| 7812 | Participant - Snow Skiing - Interest |
| 7813 | Participant - Motorcycling - Interest |
| 7814 | Participant - Equestrian - Interest |
| 7815 | Home Furnishings/Decorating - Interest |
| 7816 | Home Improvement - Interest |
| 7817 | Gardening - Interest |
| 7820 | Gambling - Casino - Interest |

APPENDIX A-continued

| Element | Description |
|---|---|
| 7821 | Sweepstakes/Contests - Interest |
| 7822 | Sports Grouping - Interest |
| 7823 | Outdoors Grouping - Interest |
| 7824 | Travel Grouping - Interest |
| 7825 | Reading Grouping - Interest |
| 7826 | Cooking/Food Grouping - Interest |
| 7827 | Exercise/Health Grouping - Interest |
| 7828 | Movie/Music Grouping - Interest |
| 7829 | Electronics/Computers Grouping - Interest |
| 7830 | Home Improvement Grouping - Interest |
| 7831 | Investing/Finance Grouping - Interest |
| 7832 | Collectibles and Antiques Grouping - Interest |
| 7840 | Boat Owner - Interest |
| 7841 | Career Interest |
| 7842 | Christian Families - Interest |
| 7843 | Collectibles - Sports Memorabilia - Interest |
| 7844 | Education Online - Interest |
| 7846 | Investments - Foreign - Interest |
| 7847 | NASCAR - Interest |
| 7848 | Reading - Financial Newsletter Subscribers - Interest |
| 7849 | Beauty and Cosmetics - Interest |
| 7850 | Consumer Survey Responders - Interest |
| 7851 | Home Improvement - Do-It-Yourselfers - Interest |
| 8236 | Money Seekers - Interest |
| 8257 | Spectator - TV Sports - Interest |
| 8263 | Collector - Avid - Interest |
| 8271 | Home Living - Interest |
| 8272 | DIY Living - Interest |
| 8274 | Exercise - Sporty Living - Interest |
| 8276 | Upscale Living - Interest |
| 8277 | Cultural/Artistic Living - Interest |
| 8278 | Wall Street Living - Interest |
| 8279 | High-Tech Living - Interest |
| 8321 | Common Living - Interest |
| 8322 | Professional Living - Interest |
| 8326 | Broader Living - Interest |

LIFE EVENT

| Element | Description |
|---|---|
| 7467 | LIFE EVENT - RECENT HOME BUYER |
| 7468 | LIFE EVENT - RECENT MORTGAGE BORROWER |
| 7469 | LIFE EVENT - NEW PARENT |
| 7470 | LIFE EVENT - CHILD NEARING HIGH SCHOOL GRADUATION |
| 7471 | Adult - College Graduate - LE |
| 7472 | Adult - Empty Nester - LE |
| 7474 | Adult - Expectant Parent - LE |
| 7475 | Intend to Purchase - Vehicle - LE |
| 7476 | Marital - Divorced - LE |
| 7477 | Marital - Newlyweds - LE |

REAL PROPERTY

| Element | Description |
|---|---|
| 7850 | Consumer Survey Responders - Interest |
| 8434 | LOAN DATE1 |
| 8437 | TOTAL LOAN RANGE |
| 8439 | LOT SIZE RANGE |
| 8440 | YEAR BUILT RANGE |
| 8441 | HOME SIZE RANGE |
| 8463 | MARKET VALUE DECILE |
| 8555 | OWNER TYPE DETAIL |
| 8557 | ASSESSED VALUE RANGE |
| 8561 | PURCHASE AMOUNT RANGE |
| 8562 | LOAN DATE2 |
| 8563 | LOAN DATE3 |
| 8567 | LOAN AMOUNT RANGE 1 |
| 8568 | LOAN AMOUNT RANGE 2 |
| 8569 | LOAN AMOUNT RANGE 3 |
| 8570 | LOAN TYPE 1 |
| 8571 | LOAN TYPE 2 |
| 8572 | INTEREST RATE TYPE 1 |
| 8573 | INTEREST RATE TYPE 2 |
| 8574 | INTEREST RATE TYPE 3 |
| 8575 | LOAN TRAN 1 |
| 8576 | LOAN TRAN 2 |
| 8579 | PURCHASE DATE/Purchase Date of Home (YYYYMM) |
| 8581 | PROPERTY TYPE DETAIL |
| 8584 | LOAN TO VALUE RANGE |
| 8585 | AVAILABLE EQUITY RANGE |
| 8586 | LEND ABLE EQUITY RANGE |
| 8587 | REAL ESTATE INVESTMENT |
| 8588 | HOME SQUARE FEET |
| 8590 | X-DATE (LOAN MONTH) |
| 8590 | X-DATE (PURCHASE MONTH) |
| 8591 | PRESENCE POOL |
| 8592 | YEAR HOME WAS BUILT - ACTUAL |
| 8606 | HOME OWNER/RENTER |
| 8607 | LENGTH OF RESIDENCE |
| 8608 | DWELLING SIZE |
| 8642 | HOME MARKET VALUE |
| 8643 | PURCHASE DATE OF HOME |
| 8644 | PURCHASE YEAR |
| 8663 | AVAILABLE HOME EQUITY RANGE |
| 8701 | PROPERTY TYPE |
| 8840 | LENDER CODE 1 |
| 8841 | LENDER CODE 2 |
| 8842 | LENDER CODE 3 |
| 8843 | LENDER TYPE 1 |
| 8844 | LENDER TYPE 2 |
| 8845 | LENDER TYPE 3 |
| 8850 | MARKET VALUE INDICATOR/QUALITY FLAG |

TECHNOLOGY

| Element | Description |
|---|---|
| 2300 | Internet Connection Type |
| 8630 | PC Owner |
| 8654 | PC DSL/High Speed User |
| 8666 | PC Operating System |
| 8670 | PC Software Buyer |

TRAVEL

| Element | Description |
|---|---|
| 2511 | Travel - Services - Type - Air |

VEHICLE

| Element | Description |
|---|---|
| 2607 | Vehicle/Auto - New/Used Indicator - 1st Vehicle |
| 2608 | Vehicle/Auto - New/Used Indicator - 2nd Vehicle |
| 8165 | Vehicle - Truck/Motorcycle/RV Owner |
| 8646 | Vehicle - New Car Buyer |
| 8647 | Vehicle - Known Owned Number |
| 8648 | Vehicle - Dominant Lifestyle Indicator |
| 9040 | Vehicle Make Code (1st Vehicle) |
| 9041 | Vehicle Model Code (1st Vehicle) |
| 9042 | Vehicle Year (1st Vehicle) |
| 9050 | Vehicle Make Code (2nd Vehicle) |
| 9051 | Vehicle Model Code (2nd Vehicle) |
| 9052 | Vehicle Year (2nd Vehicle) |

Ethnicity

| Element | Description |
|---|---|
| 8945 | Etech Ethnicity Data |

What is claimed is:

1. A computer program product embodied in a non-transitory computer readable medium that, when executing on one or more computing devices, performs the steps of:

receiving a universal data set comprising geographic data for a plurality of customers within a geographic area, the universal data set having an order and the universal data set aggregated at a household level;

importing consumer panel data according to the order of the universal data set, the consumer panel data including a number of customer-reported transactions for a first subset of the plurality of customers and the consumer panel data aggregated at an individual customer level;

importing retailer data according to the order of the universal data set, until a pre-determined threshold of a retailer for obtaining the retailer data from the retailer is achieved, the retailer data including customer data from the retailer for a second subset of the plurality of customers, wherein the second subset overlaps the first subset, and the retailer data aggregated at a retailer-provided level; and combining the consumer panel data and the retailer data according to the order of the universal data set at a normalized level of aggregation, thereby providing a data set representative of the first subset of the plurality of customers and the second subset of the plurality of customers.

2. The computer program product of claim 1, wherein the retailer data includes point of sale data.

3. The computer program product of claim 1, wherein the retailer data includes shipping data.

4. The computer program product of claim 1, wherein the retailer data includes media delivery data.

5. The computer program product of claim 1, wherein the retailer data includes credit card data.

6. The computer program product of claim 1, wherein the retailer data includes clickstream data.

7. The computer program product of claim 1, further comprising code for performing the step of modeling a propensity for a specific behavior for the plurality of customers in the universal data set according to the data set representative of the first subset of the plurality of customers and the second subset of the plurality of customers.

8. The computer program product of claim 7 wherein the specific behavior includes at least one of:
   buying a particular brand of goods or services,
   purchasing a specified collection of goods or services, or a dollar amount worth of goods or services, and
   consuming media from a particular media outlet.

9. The computer program product of claim 7, wherein the specific behavior includes shopping at a particular store.

10. The computer program product of claim 8, wherein the specific behavior includes buying goods or services at a discount.

11. A method comprising:
   receiving at a computer a universal data set comprising geographic data for a plurality of customers within a geographic area, the universal data set having an order and the universal data set aggregated at a household level;
   importing to a memory of the computer consumer panel data according to the order of the universal data set, the consumer panel data including a number of customer-reported transactions for a first subset of the plurality of customers and the consumer panel data aggregated at an individual customer level;
   importing to the memory of the computer retailer data according to the order of the universal data set, until a pre-determined threshold of a retailer for obtaining the retailer data from the retailer is achieved, the retailer data including customer data from the retailer for a second subset of the plurality of customers, wherein the second subset overlaps the first subset, and the retailer data aggregated at a retailer-provided level; and
   with the computer, combining the consumer panel data and the retailer data according to the order of the universal data set at a normalized level of aggregation, thereby providing data set representative of the first subset of the plurality of customers and the second subset of the plurality of customers.

12. The method of claim 11, wherein the retailer data includes point of sale data.

13. The method of claim 11, wherein the retailer data includes shipping data.

14. The method of claim 11, wherein the retailer data includes media delivery data.

15. The method of claim 11, wherein the retailer data includes credit card data.

16. The method of claim 11, wherein the retailer data includes clickstream data.

17. The method of claim 11, further comprising code for performing the step of modeling a propensity for a specific behavior for the plurality of customers in the universal data set according to the data set representative of the first subset of the plurality of customers and the second subset of the plurality of customers.

18. The method of claim 17 wherein the specific behavior includes at least one of:
   buying a particular brand of goods or services,
   purchasing a specified collection of goods or services, or a dollar amount worth of goods or services, and
   consuming media from a particular media outlet.

19. The method of claim 17, wherein the specific behavior includes shopping at a particular store.

20. The method of claim 18, wherein the specific behavior includes buying goods or services at a discount.

* * * * *